June 22, 1926.  E. H. GOLD ET AL  1,589,801
FLEXIBLE PIPE CONNECTION
Filed March 17, 1922  3 Sheets-Sheet 1
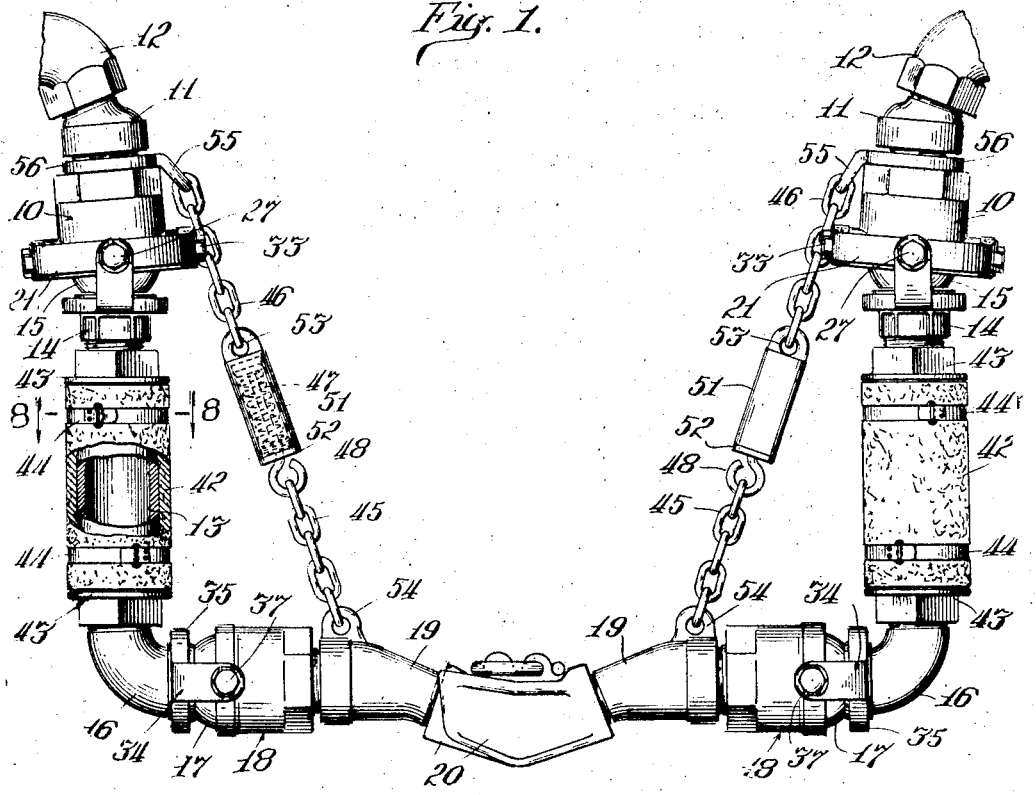
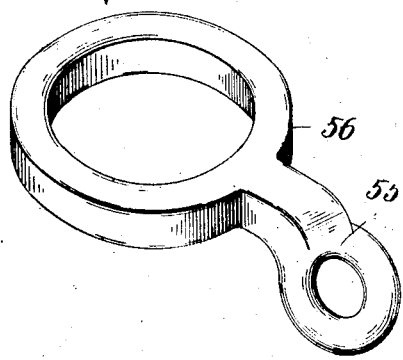
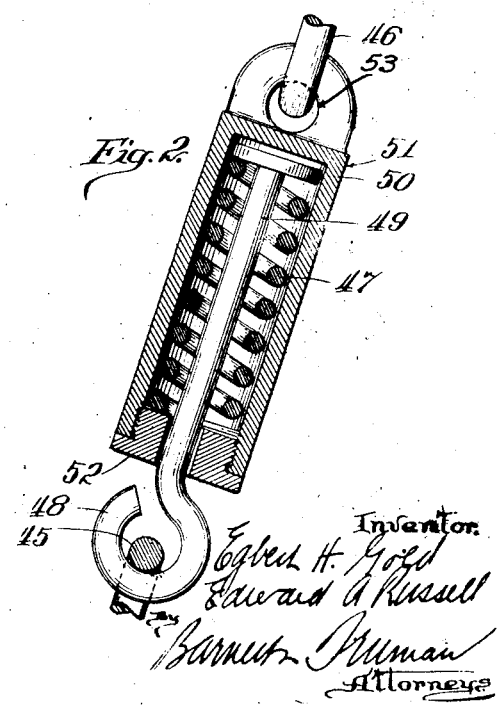

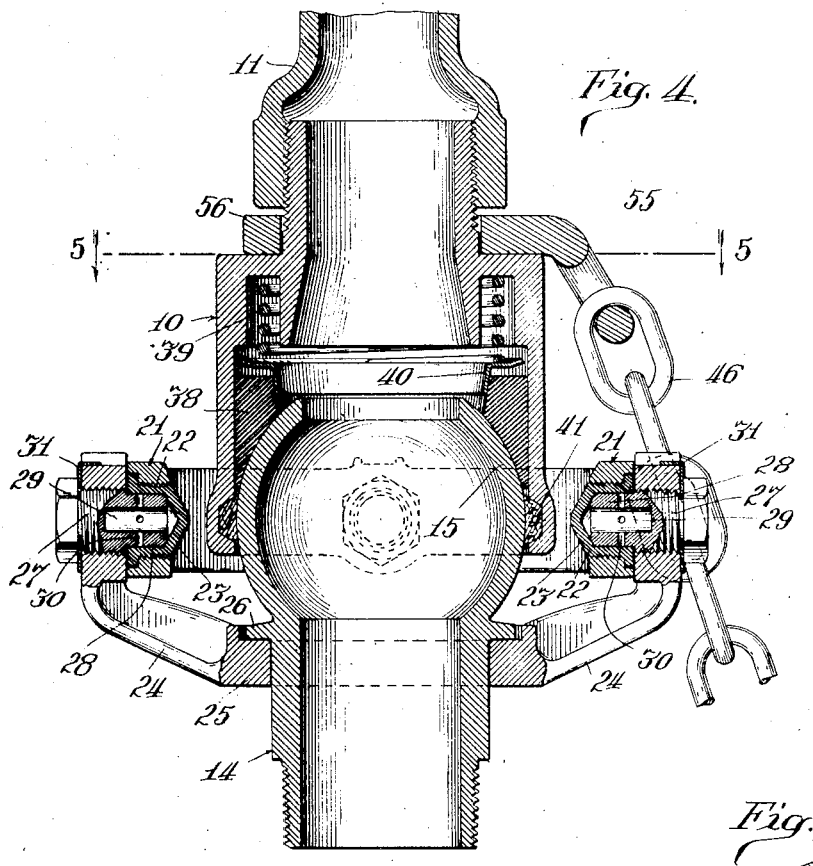
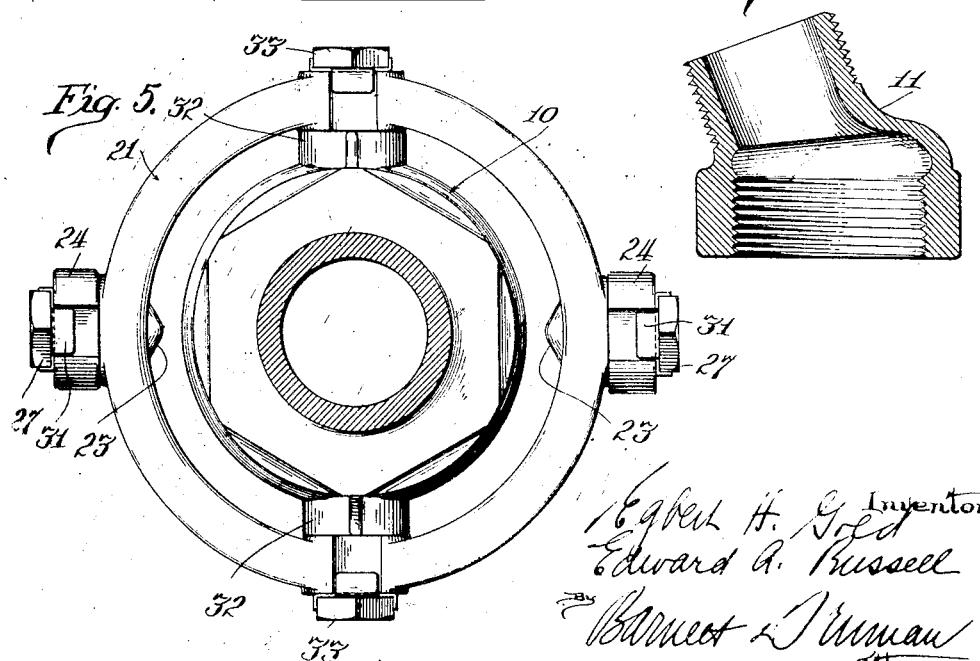

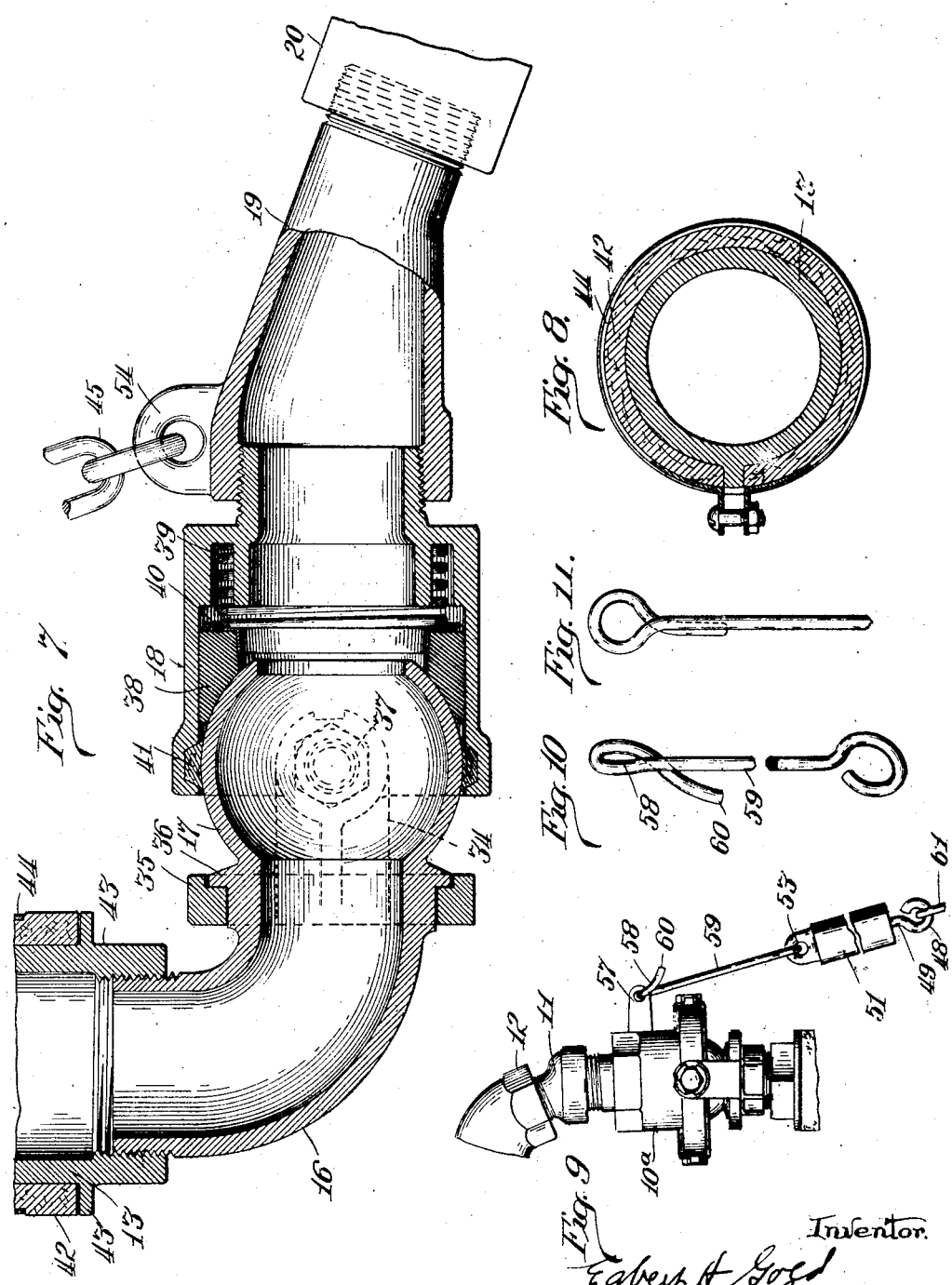

Patented June 22, 1926.

1,589,801

UNITED STATES PATENT OFFICE.

EGBERT H. GOLD AND EDWARD A. RUSSELL, OF CHICAGO, ILLINOIS; SAID RUSSELL ASSIGNOR TO VAPOR CAR HEATING COMPANY, INC., OF CHICAGO, ILLINOIS, A CORPORATION OF NEW YORK.

FLEXIBLE PIPE CONNECTION.

Application filed March 17, 1922. Serial No. 544,448.

Our invention relates to a conduit or tubular structure consisting of metal elements flexibly articulated so as to form a fluid tight connection between the train pipes of the adjacent cars of a railroad train to take the place of the rubber hoses ordinarily used for this purpose. The complete connection consists, in each case, of two flexible structures, one for each of the train pipes, to be connected, these structures being coupled together by any suitable means, for example, the couplers such as are used with the rubber hoses heretofore generally employed for making this connection.

When the car is at the end of the train the pipe connecting structure at the rear extremity of the car will, obviously, have no mating element to be coupled with, and in such case it is usual to provide on the end of the car a chain or cord with a hook or like device for engagement with the coupler to hold the same away from the road bed. If this were not done, the connecting structure might be broken or otherwise damaged by contact with the ties or other parts of the track or road bed. It happens, however, that the trainmen through carelessness frequently fail to hook up the pipe connections at the rear end of the train and while the failure to do this is likely to cause trouble even when rubber hoses are used, it is particularly objectionable when the connection consists of an articulated metal structure which is relatively costly, very flexible, so that it will hang low from the car when uncoupled, and of a construction easily damaged by contact with obstructions.

One of the principal objects of this invention is to provide a simple device for permanently supporting the outer end of a pipe connecting structure of the type mentioned and holding the same at a safe distance above the road bed, in combination with a pipe connecting structure so formed that when thus supported the structure will have requisite flexibility, first, to permit the engagement and disengagement of the couplers, and, second, to allow the articulated members a range of movements necessary in order that the connection may accommodate itself to the movements of the car with respect to the adjacent car when the train rounds curves or passes over inequalities in the track.

The invention is illustrated in a preferred embodiment in the accompanying drawings, wherein—

Fig. 1 is a view, in elevation, of a flexible connection, constructed in accordance with our invention, for the steam train pipes of adjacent railway cars.

Fig. 2 is a longitudinal sectional view, with the scale enlarged, of a portion of the device for holding up the lower end of one of the flexible structures forming said connection, when uncoupled from the other such structure.

Fig. 3 is a view, in perspective, of another part of the supporting device.

Fig. 4 is a longitudinal sectional view through the upper portion of the structure, showing the universal joint constituting the upper articulation.

Fig. 5 is a sectional plan on line 5—5 of Fig. 4.

Fig. 6 is a longitudinal sectional view of the union or adapter for attachment of the flexible structure to the train pipe.

Fig. 7 is a longitudinal sectional view illustrating the lower or outer portion of the structure.

Fig. 8 is a sectional view on line 8—8 of Fig. 1.

Fig. 9 is a fragmentary view, in elevation, of a modification, and

Figs. 10 and 11 are views, in perspective, of one of the elements of the modified construction.

Fig. 1 shows the complete connection as consisting of two identical structures, one attached to one of the train pipes and the other attached to the train pipe of the adjacent car. It will be understood, however, that assuming the use of a standard type of coupler, the connecting device or flexible conduit of our invention might be coupled up with any sort of connecting device such, for example, as the rubber hose type of connection heretofore commonly used upon the steam or air train pipes of railway cars.

The flexible metallic conduit structure, as shown in the drawings, consists of the following parts: 10 is a socket member secured by a union or adapter 11 (Fig. 6) to the end valve 12 on the train pipe, the adapter being slightly angular as shown, so that the upper portion of the flexible structure will hang from the car in a substantially vertical position.

In the drawings the internal diameter of the flexible conduit structure is shown as larger than the internal diameter of the train pipe end valve. By changing the adapters the flexible structures, as herein disclosed, may be attached to train pipes of different diameters without altering said structures or the end valves. 13 is a tubular member into the upper end of which is screwed a straight fitting 14 terminating in a ball 15 which enters the socket member 10. To the lower end of the tubular member 13 is similarly attached an elbow fitting 16 terminating in a ball 17 which extends into a socket member 18 (Fig. 7), the latter having connected thereto by means of a union 19, a coupler 20 preferably of one of the standard types used for making the connections between railway train pipes. We have shown in the drawings a common form of gravity hose coupler adapted to be engaged with and disengaged from a mating coupler by a rocking movement.

The upper end of the intermediate element 13, 14, 16 is articulated with the fixed socket member 10 preferably by an arrangement which permits universal angular movement of the intermediate member, within certain limits, together with a swiveling or rotary movement of the intermediate member on its central longitudinal axis. The arrangements for giving this species of articulation are preferably as follows: 21 is a ring into which are fitted a pair of diametrically disposed bushings 22 preferably of brass or bronze. These bushings have closed, preferably conical, ends 23 and have a threaded engagement with the ring so that when worn they may be readily replaced. 24 is a yoke having an annular neck 25 swiveled on the fitting 14 against a rib 26 thereof. Screwed into the ends of yoke 24 are a pair of preferably hard steel pivot studs 27 having smooth end portions 28 closely fitting into the bushings 22. Preferably the studs are formed each with a central lubricant duct 29 and with radial branch ducts 30 extending from the central duct to the bearing surface of the stud on the bushing. In assembling the parts of the device the bushing 22 is partly filled with a lubricant which is forced through the ducts 29, 30 when the stud is screwed down into the bushing. The stud may be held in place, if desired, by a nut lock 31. The socket member 10 is formed with a pair of bosses 32 diametrically arranged and at right angles to the pivot studs 27 into which project, through ring 21, a pair of pivot studs 33 preferably constructed like the pivot studs 27, bushings, corresponding to the bushings 22 being preferably arranged in the bosses 32 to receive the ends of the pivot studs.

The socket member 18 is articulated with the lower end of the intermediate element 13, 14, 16, by an arrangement which permits angular movement of the socket member on one axis only, together with a rotary or swiveling movement as in the case of the upper joint. This articulation is made up as follows: A yoke 34, having a collar 35 rotatably mounted on the fitting 16 against a shoulder 36 thereon, is pivoted by means of a pair of horizontally arranged pivot studs 37 to the socket member 18.

The two ball and socket joints above described are made leak proof by means of arrangements as follows, reference being made particularly to the upper joint detailed in Fig. 4: 38 is a gasket made preferably of rubber composition arranged within socket member 10 and against and between the inner surface of the socket member and the outer surface of the ball 15. This gasket is forced into place by coiled spring 39 bearing against a metal follower 40 which projects into the gasket. The socket member is formed near its lower edge, internally, with a groove in which is located a packing ring 41, the purpose of which is to prevent dust, dirt, cinders and the like from entering between the ball and socket. The lower joint, as shown in Fig. 7, is provided with similar arrangements, the parts being given corresponding reference numerals.

Preferably the tubular member 13 is covered with a heat insulating cover 42 fitting between heads 43 and held in place by clamping straps 44.

The lower or outwardly extending portion of the flexible structure, that is to say, the element carrying the coupler 20, is provided with supporting means for holding it up from the track when its coupler is not in engagement with a mating coupler. This supporting means is so constructed and arranged as to allow the flexibility at the articulations of the conduit structure requisite for coupling and uncoupling the same and for giving the structure the capacity to adapt itself to the relative shifting movements of the cars between which the connection is located. The ends of the adjacent cars of a railway train may rise and fall, one with respect to the other, may be displaced angularly one from another, and in the starting up and stopping of the train, may recede from and approach one another. In fact, these movements may be combined and it has been one of the problems in providing an all metal substitute for the rubber hoses commonly used for connecting the train pipe of a railway train, to design a structure made up of rigid parts articulated in such a way as to give the necessary flexibility while avoiding arrangements which might, with certain movements of the cars, bring parts of the structure into too close proximity to the road bed. The relatively movable parts of the flexible structure herein shown are so proportioned and disposed one with respect to the other, that all possible movements of the car are provided for without bringing any part of the structure close to the track. When one of these flexible structures, however, is not in coupled relation with another such structure (or equivalent element), as will be the case at the end of the train, the structure will sag backwardly and downwardly the parts flexing on the axes of pivot studs 27 and 37 so that the coupler 20 is likely to drag along the track. To prevent this a chain or other flexible member is provided which extends from the outer end of the structure to the upper or fixed end thereof or to some fixed point on the car adjacent thereto. Except for extreme movements of the cars, particularly movements of one car away from the other, it will be possible to use a non-extensible chain provided that the chain is arranged to extend in the diagonal direction as shown in the drawings. Preferably, however, in order to make certain the accommodation of the connection to all possible movements of the cars, the supporting member is made so that it will stretch to a certain extent under stress developed by the relative movement of the cars. The supporting member is preferably composed, with this in view, of two links or sections of chain 45, 46 between which is interposed a coiled spring 47 adapted to be put under compression by a longitudinal pull on the chains. The chain section 45 engages an eyelet 48 formed on a shank 49 having a head 50 bearing against the coiled spring 47 which is arranged in a casing 51, through the head 52 of which the shank 49 passes, the casing being formed with an eye 53 attached to the chain section 46. The lower end of the chain section 45 engages an eye 54 on the union 19. The upper end of chain section 46 is preferably attached to the fixed or upper portion of the flexible structure effectively, therefore, to the body of the car. In the arrangement shown in Figs. 1 and 4, chain 46 engages an eye 55 on an annular member 56 which is swiveled on the socket member 10. This arrangement is to make possible a permanent or undetachable connection of the chain or equivalent element 46 to the flexible structure without interference with the assembly of said structure on the car.

All of the flexible structure, including the supporting chain device, but not including the adapter 11, may be manufactured as a unit. The adapter is screwed into the end valve 12. The flexible structure is then attached to the adapter, with the annular member 56 in place, by rotating the socket member 10 which can turn through the annular member 56 and also upon the ball member 14, 15 because of the swiveled relation between yoke 24 and such ball member.

In Figs. 9, 10 and 11 we have shown a modified arrangement for supporting the outer end of the flexible pipe connection. The socket member, designated 10ª, is formed with a perforated lug 57 to receive a hook 58 on the end of a link 59. This hook is approximately spiral in its shape, the end 60 being bent around as shown particularly in Figs. 10 and 11. The hook is not engaged with lug 57 until the flexible structure has been assembled on the car. The engagement between the hook and lug 57 is made by raising the outer end of the flexible structure so as to slack the connector. The peculiar configuration of the hook prevents the hook from being accidentally disengaged. It cannot be disengaged either accidentally or intentionally while the coupler 20 is coupled up with the mating coupler. Another link 61 connects the shank 49 of the expansible device with member 19 of the pipe connection (not shown in Fig. 10 but on the other drawings).

Summary of operation: The flexible metallic conduit structure is coupled up with or uncoupled from a similar flexible structure on an adjacent car, or with an equivalent element, such as the rubber hose connection in common use in this situation, by the usual manipulations of the coupler heads. If the couplers are of the so-called gravity type, as shown in the drawings, the flexible structure will flex on the axes of pivot pins 27 and 37 to allow the forward end of the coupler to be tilted upwardly and downwardly to allow the cams of one coupler to ride over those of the other. The swiveled relation of yoke 34 allows the vertical faces of the mating couplers to be accurately fitted one against the other, even though the end valves may not be set accurately at the same angle on their respective train pipes. Any necessary lateral movement of the lower part of the flexible structure is provided for by the universal movement of the upper articulation. The position of the supporting member 45, 46, 47 allows ordinarily relative movements as between the cars. In other words, it does not interfere with the necessary flexibility of the connection under ordinary service conditions. In case of an extreme movement of separation between the cars, involving a stress on the supporting member, the latter can elongate because of the interposition in the chain sections 45, 46 of the compression spring 47. When the flexible structure is not coupled up with a mating element, as will be the case at the end of the train, the trainman does not have to hook up the end of the structure to the car. The supporting member is always in place ready for use when required. The construction of the flexible pipe connection, considered by itself, is not claimed herein, being made the subject matter of a divisional application filed March 18, 1926, Serial No. 95,805, this application being confined to the supporting device in combination with a flexible pipe connection of the type illustrated.

I claim:

1. In a flexible metallic conduit structure for making the connection between the train pipes on adjacent cars of a railway train, the combination of a tubular element secured to the car, a tubular element angularly disposed with respect thereto and provided with a coupler and an intermediate tubular element articulated with said other elements by flexible joints, an anchoring device rotatively arranged on said first named tubular element, and a flexible supporting member extending from said anchoring device to the tubular element having the coupler.

2. In a flexible metallic conduit structure for making the connection between the train pipes on adjacent cars of a railway train, the combination of a plurality of tubular elements flexibly articulated by joints allowing rotation of the elements on axes lengthwise of the structure, the element at one end of the structure being attached to the car and the element at the other end provided with a coupler, a flexible member extending between and attached to said last two specified elements, one of said attachments comprising a member rotatively arranged on the element with which it is associated.

3. In a flexible, metallic conduit structure for making the connection between the train pipes of railway cars, the combination with the end valve of the car of an angular adapter secured to the end valve, a socket member secured to the adapter, a ring pivoted to said socket member, a ball member extending into the socket member, a yoke swiveled on the ball member, the ends of which are pivoted to the ring on an axis at right angles to the aforesaid pivotal connections, a straight, substantially vertical, tubular member secured to the ball member, a right angled tubular fitting secured to the lower end of said tubular element and provided with a ball, a socket member provided with a coupler, a yoke swiveled on said last named ball member and connected with said last named socket member by a single pair of diametrically arranged pivots, a supporting member for the socket member carrying the coupler comprising two chain sections, one attached to said socket member and the other to the socket member fixed to the adapter, and a spring arranged to be put under compression by a pull as between said chain sections.

4. In a flexible metallic conduit structure for making a connection between the train pipes on adjacent cars of a railway train, the combination of a tubular element adapted to be fixedly mounted on the car, a second tubular element extending downwardly from and flexibly articulated with the first tubular element, a third tubular element flexibly articulated with the second named element and projecting outwardly from the lower end thereof and provided with a coupling member, and supporting means for said last mentioned tubular element adapted to hold it in substantially the same position when uncoupled as when coupled with a mating conduit structure, comprising flexible members connected with the first and last named tubular elements respectively and having an interlocked sliding connection with one another, and a spring interposed in said connection and arranged to be compressed by a stress tending to pull one of said members in the direction away from the other.

5. In a flexible metallic conduit structure for making a connection between the train pipes on adjacent cars of a railway train, the combination of a tubular element adapted to be fixedly mounted on the car, a second tubular element extending downwardly from and flexibly articulated with the first named tubular element, a third tubular element flexibly articulated with the second named element and projecting outwardly from the lower end thereof and provided with coupling means, and supporting means for said last named element adapted to hold it in substantially the same position when uncoupled as when coupled with a mating conduit structure, comprising an anchoring member mounted on the first named tubular member and having an outwardly projecting arm, flexible members connected with this arm and with the third mentioned tubular member respectively, and a spring interposed between said flexible members.

6. In a flexible metallic conduit structure for making a connection between the train pipe and adjacent cars of a railroad train, a conduit member flexibly articulated with the car so as to hang downwardly, a conduit member flexibly articulated with the lower end of the downwardly extending conduit member and projecting outwardly therefrom, and a flexible supporting element comprising a longitudinally resilient member, which supporting element is connected at one end to said outwardly extending conduit member and anchored at its other end to the car at a point outwardly of the articulation thereto of said downwardly extending member.

7. In a flexible metallic conduit structure for making a connection between the train pipes on adjacent cars of a railroad train, a conduit member flexibly articulated with the car so as to hang downwardly, a conduit member flexibly articulated with the lower end of the downwardly extending member and projecting outwardly therefrom and a flexible supporting element connected at one end to the outwardly extending conduit member and anchored at its other end to the car at a point outwardly of the articulation thereto of said downwardly extending conduit member, said element comprising a spring of such stiffness that it is not stressed, substantially, by the weight of said outwardly projecting conduit member when uncoupled.

8. In a flexible metallic conduit structure for making a connection between the train pipes on adjacent cars of a railroad train, a conduit member flexibly articulated with the car so as to hang downwardly, a conduit member flexibly articulated with the lower end of the downwardly extending conduit member and projecting outwardly therefrom, and a flexible supporting element connected at one end to the outwardly extending conduit member and anchored at its other end to the car at a point outwardly of the articulation thereto of said downwardly extending conduit member, said element comprising a spring arranged to be compressed by a downward movement of said outwardly extending conduit member but of such stiffness as not to be stressed, substantially, by the weight of said outwardly projecting conduit member when uncoupled.

EGBERT H. GOLD.
EDWARD A. RUSSELL.